(12) United States Patent
Labonte et al.

(10) Patent No.: US 7,584,979 B2
(45) Date of Patent: Sep. 8, 2009

(54) POWERED RETRACTABLE MOTORCYCLE STAND (76) Inventors: Daniel Labonte, 18 Andorson West, Cache Bay, Ontario (CA) P0H 1G0; Jeanne Labonte, 18 Andorson West, Cache Bay, Ontario (CA) P0H 1G0

( * ) Notice: Subject to any disclaimer, the term of this patent is extended or adjusted under 35 U.S.C. 154(b) by 505 days.

(21) Appl. No.: 11/308,434

(22) Filed: Mar. 24, 2006

(65) Prior Publication Data
US 2006/0214389 A1    Sep. 28, 2006

Related U.S. Application Data (63) Continuation-in-part of application No. 10/759,127, filed on Jan. 20, 2004, now abandoned.

(51) Int. Cl.
*B62H 7/00* (2006.01)
(52) U.S. Cl. .................. 280/293; 180/287; 254/425; 280/304; 280/766.1
(58) Field of Classification Search ............. 280/293, 280/304, 766.1, 765.1; 180/287, 219; 254/45, 254/424, 425, DIG. 2
See application file for complete search history.

(56) References Cited

U.S. PATENT DOCUMENTS

| 1,937,170 | A | * | 11/1933 | Smith | 254/425 |
|---|---|---|---|---|---|
| 3,035,713 | A | * | 5/1962 | Iserman | 212/303 |
| 3,888,464 | A | * | 6/1975 | Felsen | 254/425 |
| 4,014,519 | A | * | 3/1977 | Leigh | 254/423 |
| 4,641,124 | A | * | 2/1987 | Davis | 340/426.23 |
| 4,817,977 | A | * | 4/1989 | Bookbinder | 280/304 |
| 5,067,739 | A | * | 11/1991 | Kuan | 280/304 |
| 5,886,349 | A | * | 3/1999 | Su | 250/215 |
| 2002/0017417 | A1 | * | 2/2002 | Strasser | 180/287 |

FOREIGN PATENT DOCUMENTS

JP            1-240385       *  9/1989

* cited by examiner

*Primary Examiner*—Anne Marie M Boehler
(74) *Attorney, Agent, or Firm*—Gordon Thomson (57) ABSTRACT A powered retractable motorcycle stand is disclosed having a stationary upper assembly mounted to a motorcycle and a moving lower assembly for ground contact. The stationary assembly includes a horizontal driven shaft coupled to an electric motor coupled. Gear reduction means transfers torque from the horizontal shaft to a vertical screw shaft that extends to a ground contact position and retracts into a protective housing. The vertical screw shaft is pinned so that it does not rotate and is restricted to linear movement. A safety device to prevent operation of the motorcycle while the stand is engaged is included. Motorcycle anti-theft means are also included.

7 Claims, 8 Drawing Sheets

POWERED RETRACTABLE MOTORCYCLE STAND

CROSS-REFERENCE TO RELATED APPLICATIONS

This application is a continuation-in-part application of U.S. patent application Ser. No. 10/759,127 filed on Jan. 20, 2004 now abandoned.

BACKGROUND OF THE INVENTION

This invention relates to motorcycle stands and in particular to a powered retractable motorcycle stand with safety and anti-theft mechanisms.

Stands for motorcycles are well know and are manually operated by the rider having to displace the weight of the motorcycle on the stand by physical exertion. For small motorcycles or for large riders this is a relatively easy task. However, for very large road cruising motorcycles a great deal of strength is required to push the motorcycle onto the kick stand. For riders who are smaller or tired from a long ride the task is difficult and the motorcycle may fall while the rider attempts to push it onto the kick stand. There have been a number of attempts to overcome this problem. One proposed solution is found in U.S. Pat. No. 5,358,365 Motorcycle Lift Stand and Actuator issued to Yaple on Oct. 25, 1994. Yaple discloses a powered stand having powered units on each side of the motorcycle. Drive units on each side drive a linear actuator comprising rotary to linear motion conversion mechanisms. Each linear actuator drives a lower stand unit that is pivotally mounted and moves from a ground contact position to a retracted position. The Yaple invention has a number of disadvantages. Two units must be installed on each motorcycle to address leaning on the left side or the right side of the motorcycle. The overall device is very complex mechanically using telescoping linear actuators and therefore expensive to manufacture and keep in good repair. The device does not hide on the chassis of the motorcycle and therefore tends to detract from the pleasing lines of the machine. Therefore there is a continued need for a simple and inexpensive powered motorcycle stand that can be mounted unobtrusively to a motorcycle while providing the lift and balance capabilities needed in a motorcycle stand.

SUMMARY OF THE INVENTION

In accordance with the present invention there is provided a powered retractable motorcycle stand comprising a stationery assembly mounted to a motorcycle. The stand comprises a stationary assembly that is mounted to the motorcycle and a moving assembly that supports the motorcycle when engaged. The stand is generally mounted in place of the manual kick stand and therefore is generally located at the centre of the motorcycle so that it balances on the stand.

The stationary assembly comprises a horizontal driven shaft coupled to an electric motor. The shaft is then coupled to gear reduction means. The moving assembly comprising a vertical driven shaft with ground contact means is coupled to the gear reduction means as well. The invention further comprises means for controlling the moving assembly and means for preventing theft of the motorcycle while it is supported on the stand.

The horizontal driven shaft has a first end and a second end. The first end is coupled to the motor and the second end is coupled to the gear reduction means.

The vertical driven shaft is a threaded vertical screw gear having an axis, a first end and a second end. The second end has an unthreaded portion.

The gear reduction means is adapted to transfer torque through an angle of 90 degrees from the horizontal driven shaft to the threaded vertical screw gear. The gear reduction means comprises a worm gear coupled to the horizontal shaft second end and a spur gear. The spur gear has an outside diameter having cogs for meshing contact with the worm gear and a threaded inside diameter for meshing contact with the threaded vertical screw gear. The gear reduction means including the worm gear and the spur gear are housed within a protective gear housing.

The threaded vertical screw gear is rotationally fixed with respect to the spur gear. To accomplish this there is a linear co-axial keyway within the threaded vertical screw gear and a fixed key having a first end and a second end. The first end of the key is in sliding relationship with the co-axial key way. The second end of the key is fixed to the gear housing. The result is that rotation of the threaded vertical screw gear is prevented by the key first end and rotation of the spur gear around the threaded vertical screw gear results in a linear vertical movement of the threaded vertical screw gear from a first retracted position to a second extended position. The up and down movement of the vertical screw gear is controlled by the rotational direction of the motor which can be controlled by way of a polarity contactor.

The vertical screw gear is protected by housing it in a vertical housing attached to the gear housing so that when the vertical screw gear is in its fully retracted position it is protected within the housing. When the vertical screw gear is in its fully extended position it is exposed to the elements and so there may be provisions to lubricate the screw within the housing.

The stand is mounted to the motorcycle by mounting the stationary assembly to the motorcycle frame at two points. The first mounting point is a mounting block having a dowel that is adapted for mounting the mounting block to the motorcycle at a foot peg position. The second mounting point is a bracket that mounts to the gear housing at one end and to the motorcycle frame at the other end.

At the end of the vertical screw gear there is mounted a ground contact angle member having a ground contacting horizontal portion having a central aperture, a vertical flange portion, and a ring member fixed over the central aperture. The ring is an adapted to receive the unthreaded portion of the second end of the threaded vertical screw gear.

The stand relies upon the 12 VDC motorcycle battery for its power. The electrical circuit for the powered stand is installed in the existing motorcycle electrical circuit. To protect both circuits there is provided a circuit breaker. The stand circuit also includes a reversing polarity contactor for reversing the polarity of the electric motor thereby permitting forward and backwards rotation and hence the raising and lower the moving assembly.

To operate the stand there is an operator up/down switch mounted on the handle bar of the motorcycle in close proximity to the motorcycle engine kill switch. The up/down switch is connected to relay switch means for controlling the polarity of the electrical motor. When the stand is in ground contact there is a limit switch that permits only upward motion of the stand. There is also second limit switch means adapted to permit only downward motion of the stand when the stand is in its retracted position.

There is also included safety switch means which includes the motorcycle engine kill switch. A safety relay is connected to the circuit so that the motorcycle engine will run only when the stand is in its retracted position or when the motorcycle is in neutral gear. The up/down switch further includes an indicator light indicating that the stand is not retracted.

The invention also includes anti-theft means comprising relay means adapted to isolate the stand electric motor from the battery when the stand is extended and the key has been removed from the starter relay so that the stand cannot be retracted when the key has been removed.

OBJECTS AND ADVANTAGES OF THE INVENTION

A principal object of the present invention is to provide a powered retractable motorcycle stand capable of lifting and supporting a large motorcycle without muscular exertion of the rider.

Another objective of the present invention is to provide a powered retractable motorcycle stand capable of lifting 1800 pounds.

Another object of the present invention is to provide a powered retractable motorcycle stand that is easy to manufacture with few moving parts.

Yet another object of the present invention is to provide a powered retractable motorcycle stand that is easily mounted to the motorcycle.

Still another object of the present invention is to provide a powered retractable motorcycle stand that incorporates safety mechanisms to avoid motorcycle operation with the stand in an extended position.

Another object of the present invention is to provide a powered retractable motorcycle stand that incorporates anti-theft mechanisms.

Other objects and advantages of the present invention are set forth below in the detailed description and accompanying drawings.

BRIEF DESCRIPTION OF THE DRAWINGS

The accompanying drawings are for the purpose of illustrating a preferred embodiment of the invention and are not intended to limit the invention.

DETAILED DESCRIPTION OF THE PREFERRED EMBODIMENTS

Figure 1:
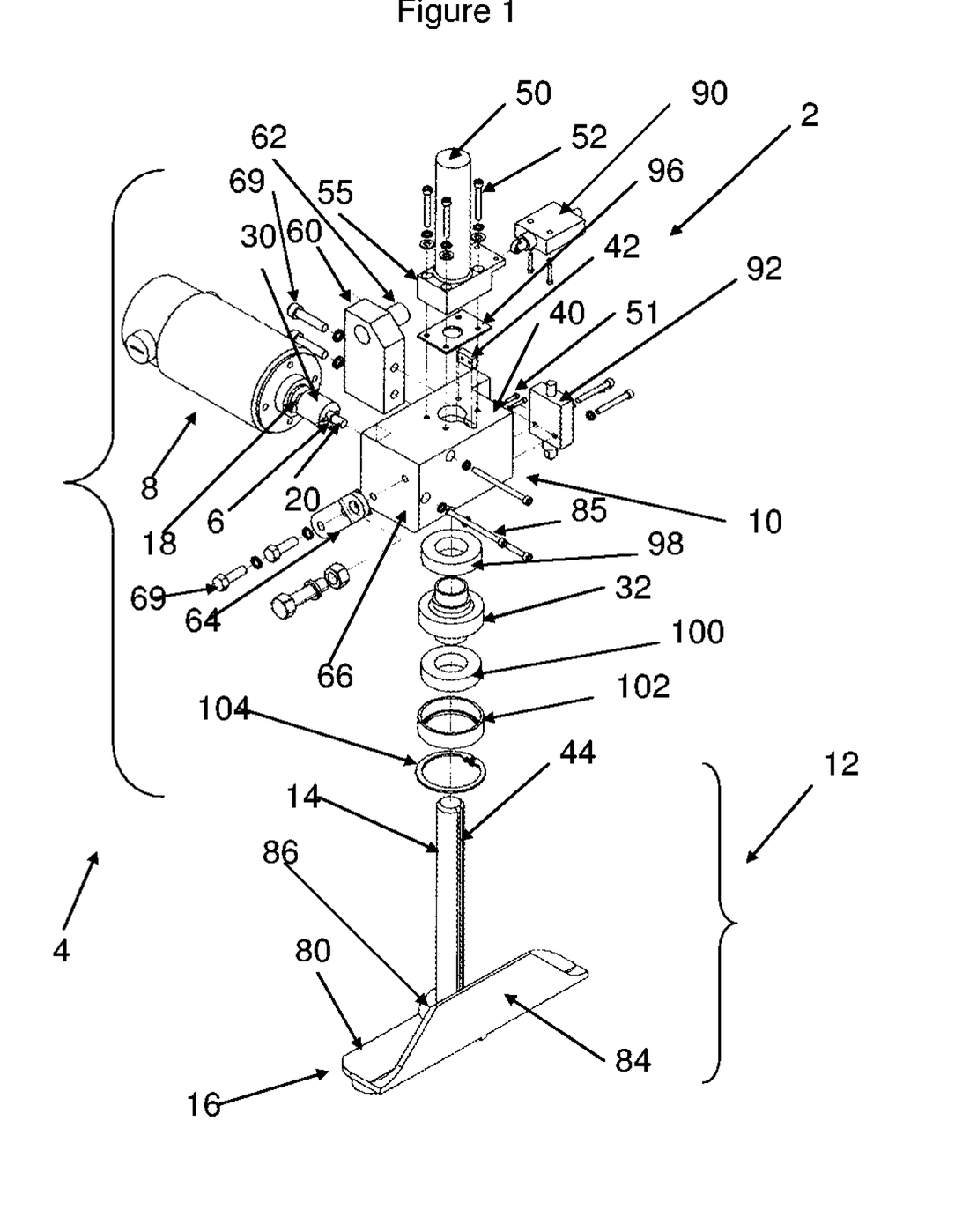
FIG. 1 is an assembly diagram of one embodiment of the invention illustrating the stationery assembly and the moving assembly.

Referring to FIG. 1 there is shown an assembly diagram of my invention a powered retractable motorcycle stand (2) comprising a stationery assembly (4) mounted to a motorcycle by mounting means further described below. The stationery assembly comprises a horizontal driven shaft (6) coupled to shaft driving means (8). The shaft (6) is in turn coupled to gear reduction means (10). A moving assembly (12) is coupled to the gear reduction means (10) in such a way that the torque generated by shaft driving means is transmitted to the moving assembly permitting it vertical motion from a first fully extended position to a second fully retracted position.

The moving assembly (12) comprises a vertical driven shaft (14) with ground contact means (16) adapted for motorcycle support. Motorcycle stand control means and motorcycle anti-theft means are also included in the invention and discussed below.

The horizontal driven shaft (6) has a first end (18) and a second end (20). The shaft driving means (8) is an electric motor coupled to the shaft first end (18). In the preferred embodiment the electric motor is a modified Bisongear™ motor series #7522 having 40 Amps peak draw and operating at 12 VDC generating about 1 HP.

Figure 2:
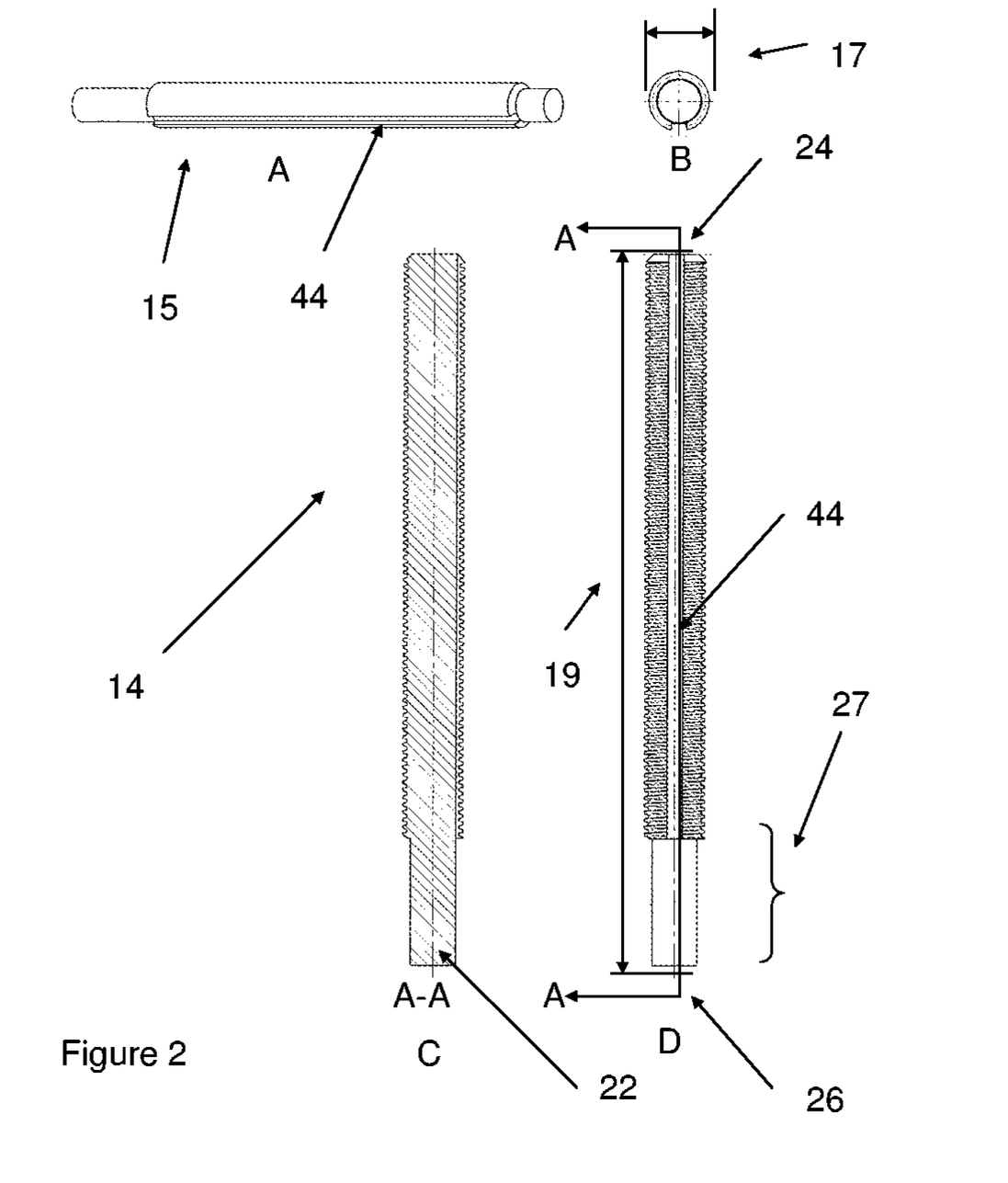
FIG. 2 is a series of views of the vertical screw gear of one embodiment of the invention.

Referring to FIG. 1 and FIG. 2 the vertical driven shaft (14) is a threaded vertical screw gear having an axis (22), a first end (24) and a second end (26). The second end has an unthreaded portion (27). FIG. 2A shows the screw gear billet (15) with notch (44) therein. In the preferred embodiment the shaft is made from stainless steel 420. FIG. 2B shows the screw gear diameter (17) of about 0.750 inches. The screw gear has a length (19) of about 12 inches long and the unthreaded portion (27) is about 1.11 inches long. The thread is 1"-8 ASA R.H. ACME thread. FIG. 2C shows the screw gear (14) in cross-section along notch (44) section A-A.

Referring to FIG. 1, the horizontal driven shaft (6) second end (20) is coupled to the gear reduction means (10). The gear reduction means is adapted to transfer torque from the horizontal driven shaft (6) to the threaded vertical screw gear (14) permitting it to move vertically and lift the weight of the motorcycle to which it is attached.

Figure 3:
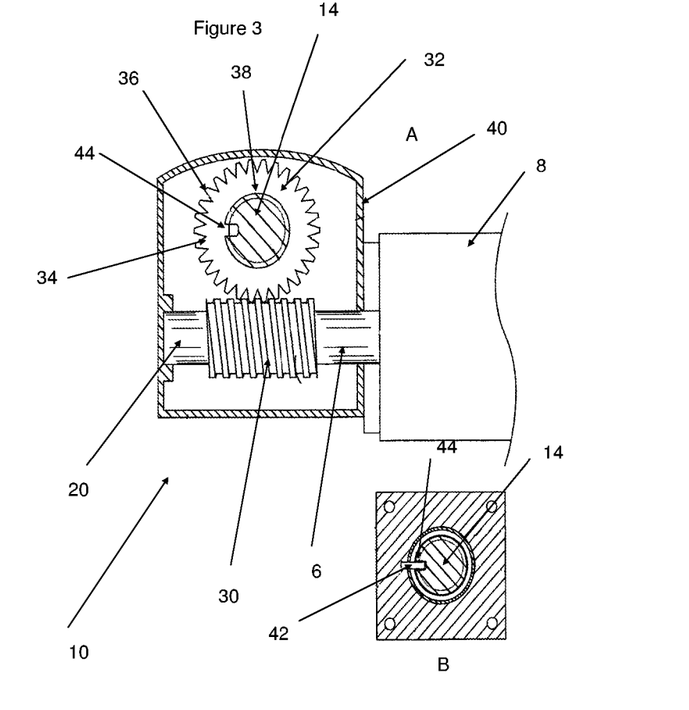
FIG. 3 is a schematic diagram of how the gear reduction means transfers torque from a horizontal shaft to a vertical shaft.

Referring to FIG. 1 and FIG. 3 view A and view B which is a schematic of gear reduction means (10) there is a worm gear (30) coupled to the horizontal shaft (6) second end (20) and a spur gear (32) having an outside perimeter (34) having cogs (36) for meshing contact with the worm gear (30). The spur gear also has a threaded inside diameter (38) for meshing contact with the threaded vertical screw gear (14). Gear reduction means is housed in gear housing (40). Torque from motor (8) is translated from rotational movement of shaft (6) to vertical linear movement of gear (14). FIG. 3B is a top view of the gear housing (40) showing key (42) in sliding relation with key way (44) preventing rotational movement of the vertical screw gear (14) thereby causing it to move up and down.

Figure 3A:
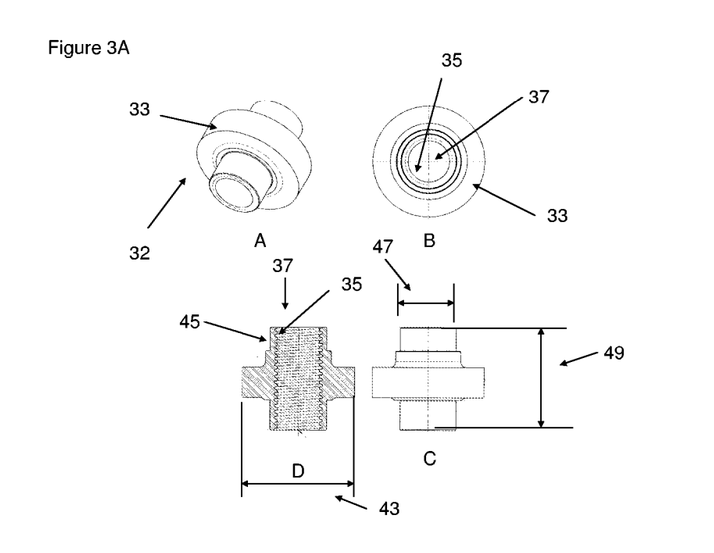
FIG. 3A is a series of views of a spur gear of one embodiment of the invention.

Referring to FIG. 3A there is shown in views FIG. 3A-A to D the spur gear (32) in uncut form. The cogs (36) are cut into the perimeter (34) of the gear wheel (33). Figure A shows the spur gear in perspective view and Figure B shows the spur gear in elevation view. The vertical screw gear is adapted to mesh with inside threads (35) and pass vertically through aperture (37). Figure C is a view from the side and Figure D is a cross-section of Figure C showing the internal threads (35). The spur gear cogs are cut to mesh with the worm gear screw (30). The spur gear generally has an outside diameter (43) of about 2.359 inches and the shaft (45) has a diameter (47) of 1.180 inches. The length (49) of the spur gear is about 2.19 inches.

Figure 4:
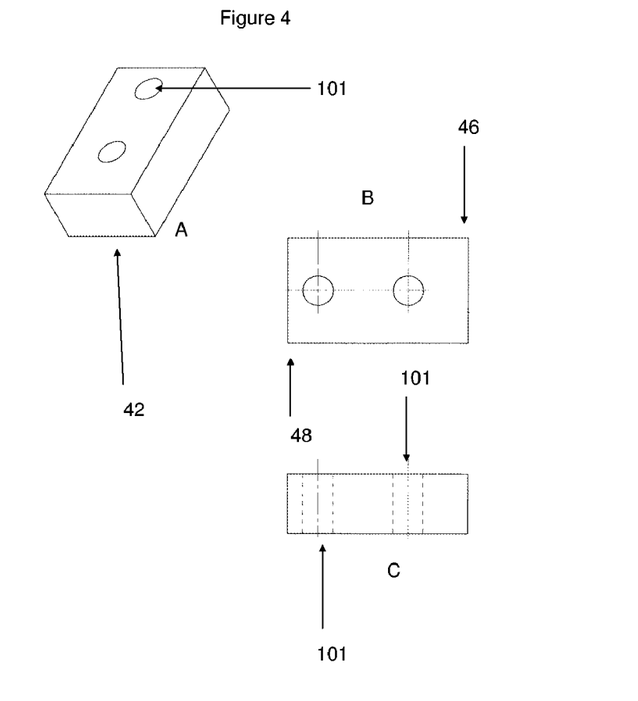
FIG. 4 is a series of views of a key of one embodiment of the invention.

Still referring to FIGS. 1 to 4 the threaded vertical screw gear (14) is rotationally fixed by fixing means with respect to the spur gear (32). In FIG. 4 there are shown three views A (perspective), B (elevation), and C (side) of a key (42) adapted to mesh within co-axial keyway (44) within the threaded vertical screw gear (14). The key (42) is fixed and has a first end (46) and a second end (48). The first end (46) is in sliding relationship the co-axial key way (44). The second end (48) is fixed to the gear housing (40) by fixing means comprising bolts (51) into apertures (101). The result is that rotation of the threaded vertical screw gear (14) is prevented by the key first end (46) and rotation of the spur gear around the threaded vertical screw gear results in a linear vertical movement of the threaded vertical screw gear from a first retracted position to a second extended position. The key has a length (103) of about 0.75 inches long and a width (105) of about 0.44 inches and a thickness (107) of about 0.25 thick. The apertures (101) are located along the length of the key at 0.125 inches and 0.50 inches.

Figure 5:
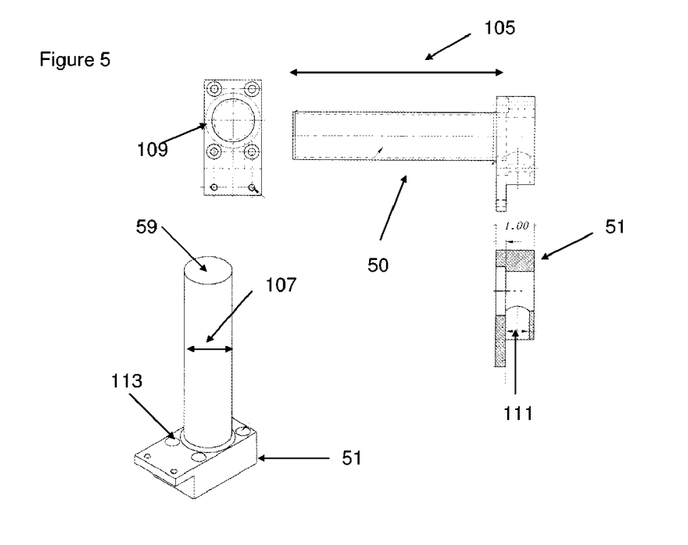
FIG. 5 is a series of views of the tubular screw gear housing of one embodiment of the invention.

Referring to FIGS. 1 and 5, the stationery assembly further comprises a tubular housing (50) adapted to protectively house the threaded vertical screw gear (14) when it is in its retracted position. The housing (50) includes an end cap (59). The housing (50) has a length (105) of about 5.5 inches long and a diameter (107) of about 1.25 inches. The housing is mounted to limit switch mounting block (51) by way of aperture (109) either in a press fit relationship or it can be welded. The limit switch mounting block (51) includes a bore (111) adapted to fit the sensing end of the limit switch so that when the screw gear is in its fully retracted state the limit switch is contacted. The limit switch mounting block is mounted to the top of the gear housing by way of bolts (52) through apertures (113).

Figure 6:
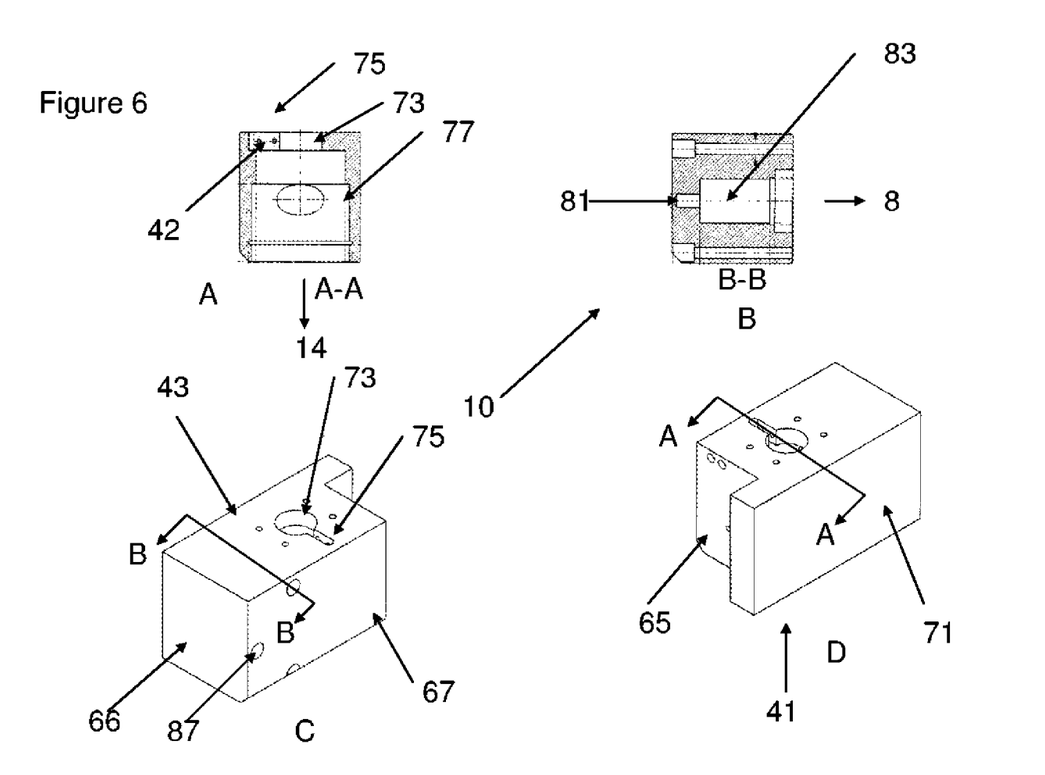
FIG. 6 is a series of views of the gear box of one embodiment of the invention.

Referring to FIG. 1 and FIG. 6 there are shown four views A to D of the gear box housing (40) housing gear reduction means (10). The gear box housing has a first side (65) and a second side (66) a front side (67) and a back side (71). There is a top side (43) and a bottom side (41). Shown on the top side is aperture (73) adapted to permit the vertical screw gear (14) to pass there through. Also shown is key slot (75) adapted to permit the key (42) to engage the vertical screw gear key way (44). View A is a cross section of view D across A-A. Aperture (73) and key slot (75) are shown. Key (42) is shown in key slot (75). Key guide (44) within the vertical screw gear (14) engages the key second end (46) to prevent it from turning. The key is held in place by bolts (51) placed into apertures (55). The spur gear is housed within chamber (77). View B is a cross-section of view C across B-B. Motor shaft (6) with worm gear (30) enters the gear box at aperture (70) so that the shaft second end (20) is held within notch (81). The worm gear (30) is held within chamber (83) and meshes cooperatively with the spur gear. The motor (8) is mounted to the gear housing by way of four bolts (85) through apertures (87).

Figure 7:
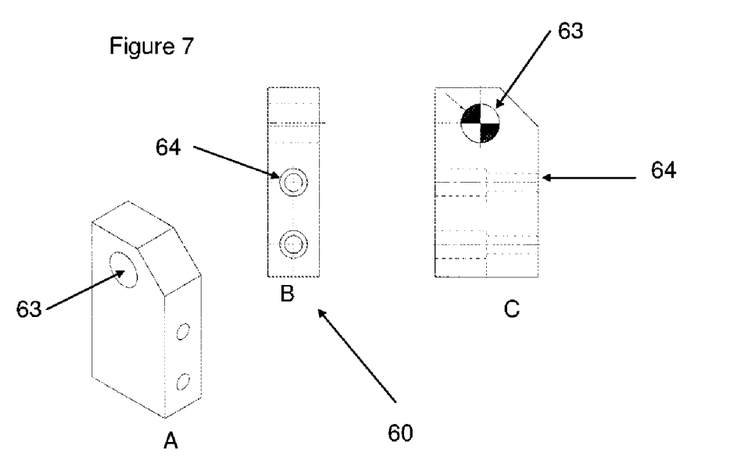
FIG. 7 is a series of views of a mounting block of one embodiment of the invention.

Referring to FIG. 1 and FIG. 7 mounting means to mount the stationery assembly to the motorcycle comprises a mounting block (60) having dowel means (62) inserted through aperture (63) which is adapted for mounting the mounting block to the motorcycle generally at one of the back foot pegs. The mounting block is mounted to the gear housing (40) first side (65) using fastening bolts (67) through apertures (64).

Figure 8:
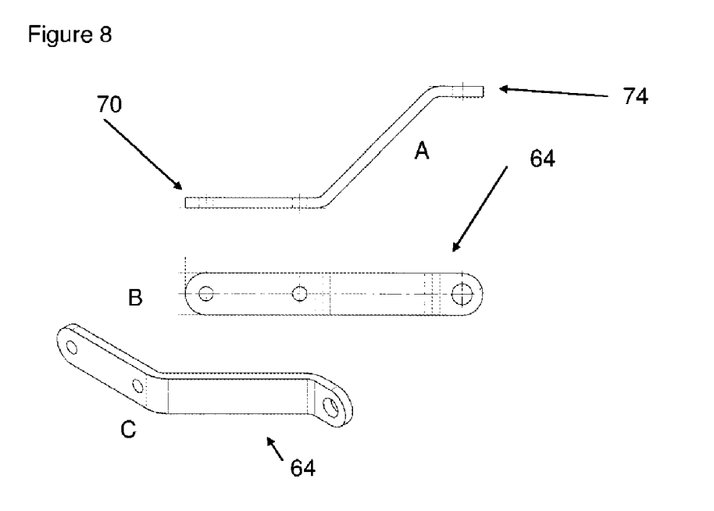
FIG. 8 is a series of views of a mounting bracket of one embodiment of the invention.

Referring to FIG. 1 and FIG. 8 mounting means also includes mounting bracket (64) adapted for mounting the mounting block to gear housing second side (66). The mounting bracket (64) has a first end (70) for mounting to gear housing second side (66) using fastening means (69). The bracket second end (74) is for mounting to the motorcycle.

Figure 9:
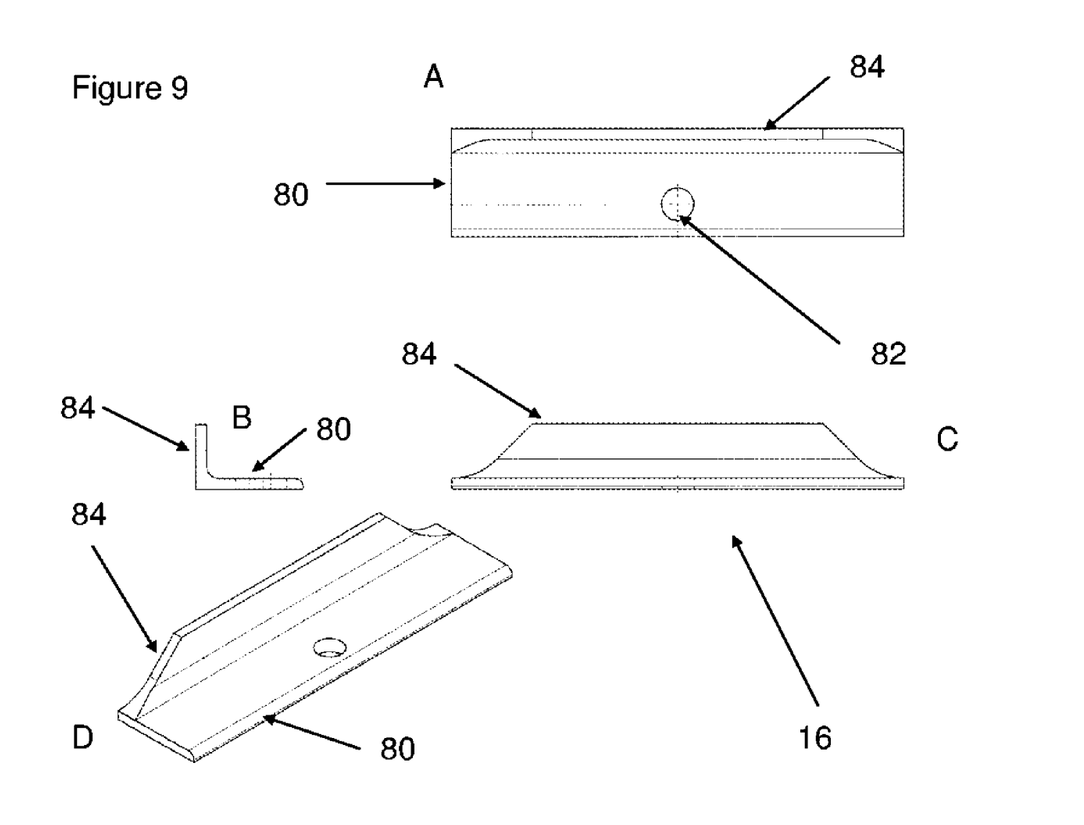
FIG. 9 is a series of views of the ground contact member of one embodiment of the invention.
Figure 10:
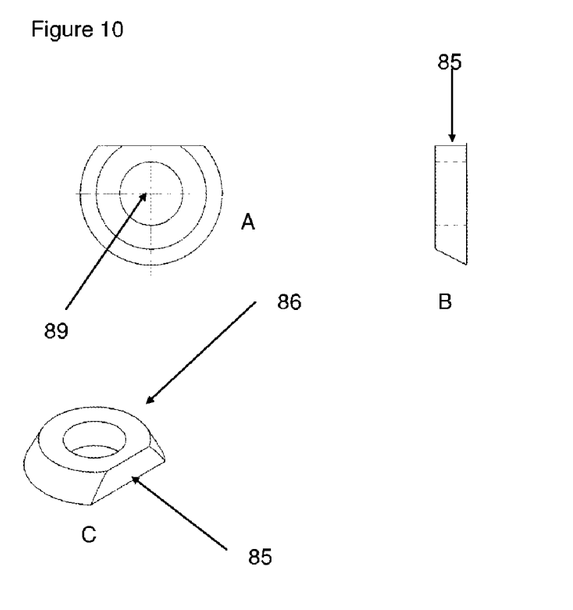
FIG. 10 is a series of views of the ring member adapted to receive the second end of the screw gear in one embodiment of the invention.

Referring to FIG. 1, FIG. 9 and FIG. 10 the ground contact means (16) for motorcycle support comprises a ground contacting angle member having a ground contacting horizontal portion (80) having a central aperture (82), a vertical flange portion (84), and a ring member (86) fixed over the central aperture (82). The ring member is adapted to receive the unthreaded portion of the second end of the threaded vertical screw gear. Ring member (86) is further illustrated in FIG. 10 views A to C as having an aperture (89) coincident with aperture (82) and a butt (85) adapted to fit against vertical flange portion (84).

Referring to FIG. 1, stationery assembly means (4) also includes a first limit switch means (90) and second limit switch means (92) adapted to control movement of the moving assembly. Additional parts to the motorcycle stand assembly include gasket (96) between housing (50) and gear box surface (54), spur gear upper bushing (98), spur gear lower bushing (100), spur gear enclosure (102) and compression ring member (104) adapted to maintain the spur gear within the gear housing.

Figure 11:
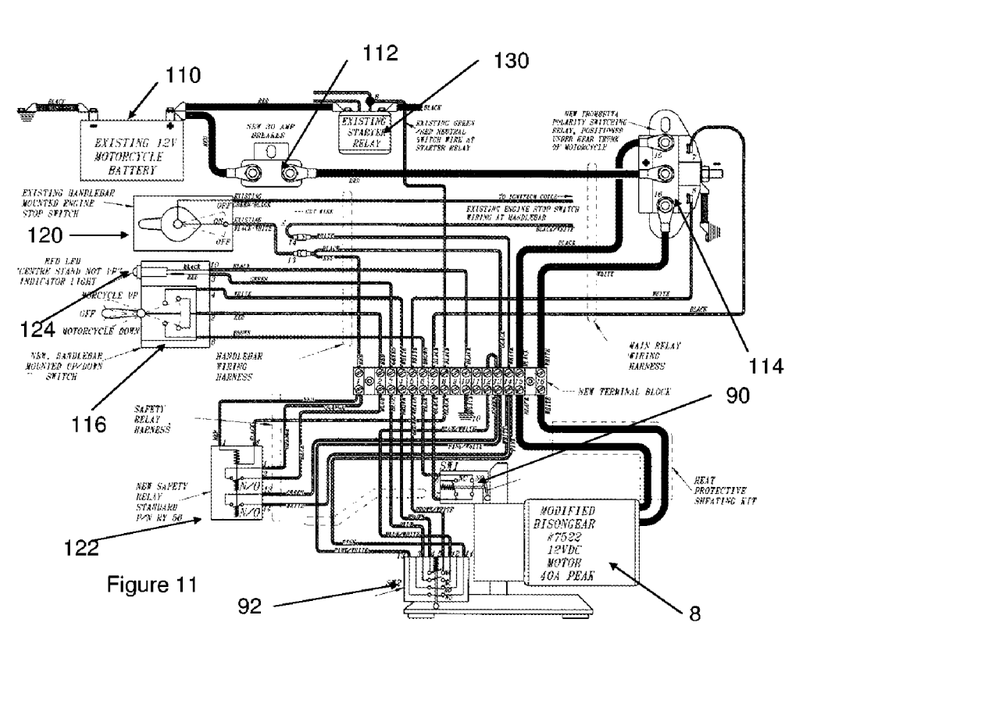
FIG. 11 is a schematic diagram of the electrical circuit of one embodiment of the invention.

Referring to FIG. 11 there is shown a schematic of the stand electric circuit as it interfaces with the motorcycle electric circuit. The electric circuit is the moving assembly control means. There is a DC power source (110) which is the motorcycle battery for energizing the circuit. The battery is first connected to a circuit breaker (112) for circuit protection and then to a reversing polarity contactor (114) for reversing the polarity of the electric motor (8) thereby permitting forward and backwards rotation of the motor and the resultant raising and lowering of the moving assembly. There is also an up/down switch (116) connected to relay switch means (92) connected to which is in turn connected to the reversing polarity contactor (114) for engaging the electric motor (8) in a desired direction thereby lowering or raising the stand. There is also first limit switch means (90) adapted to permit only upward motion of the stand when the stand is in ground contact; and, second limit switch means (92) adapted to permit only downward motion of the stand when the stand is in its retracted position. There is also safety switch means comprising a motorcycle engine stop switch (120) having an off position and an on position and connected to safety relay means (122) which is in turn connected to the up/down switch (116) so that said motorcycle engine will run only when the stand is in its retracted position or when the motorcycle is in neutral gear. The up/down switch further includes an indicator light (124) indicating that the stand is not retracted.

Still referring to FIG. 11, the motorcycle anti-theft means comprises relay means (92) adapted to isolate the electric motor (8) from the battery (110) when the stand is extended and the key has been removed from the starter relay (130) so that the stand cannot be retracted when the key has been removed.

Although the invention has been described in detail with particular reference to these preferred embodiments, other embodiments are possible. Variations and modifications of the present invention will be obvious to persons skilled in the art and the claims are intended to cover all such variations and modifications.

What is claimed is:

1. A powered retractable stand for a motorcycle, said stand having a retracted position and an extended position, the stand comprising:
   a. motorcycle anti-theft means;
   b. a stationary assembly mounted to said motorcycle by mounting means, said stationary assembly comprising a horizontal driven shaft;
   c. a moving assembly comprising control means and a threaded vertical screw gear comprising ground contact means for motorcycle support;
   d. wherein, said horizontal driven shaft comprises a first end coupled to an electric motor and a second end coupled to a worm gear;
   e. and wherein, said threaded vertical screw gear further comprises a first end for coupling to a spur gear and a second end having an unthreaded portion adjacent thereto for mounting said ground contact means;
   f. and wherein, said spur gear is housed in a gear housing and has a cogged outside perimeter in meshing contact with said worm gear and a threaded inside diameter in meshing contact with the threaded vertical screw gear;
   g. and wherein, the threaded vertical screw gear is rotationally fixed by a linear co-axial keyway within the threaded vertical screw gear and a fixed key having a key first end and a key second end, wherein said key first end is in sliding relationship with said co-axial key way and said key second end is fixed to said gear housing, the result being that rotation of the threaded vertical screw gear is prevented by the key first end and rotation of the spur gear around the threaded vertical screw gear results in a linear vertical movement of the threaded vertical screw gear from said retracted position to said extended position;
   h. and wherein, said mounting means comprises a mounting block having dowel means adapted for mounting said mounting block to the motorcycle and fastening means adapted for mounting the mounting block to a gear housing first side; and, a mounting bracket having a first end for mounting to a gear housing second side and a second end for mounting to the motorcycle.

2. The stand as claimed in claim 1 wherein the ground contact means for motorcycle support comprises a ground contacting angle member having a ground contacting horizontal portion having a central aperture, a vertical flange portion, and a ring member fixed over said central aperture and adapted to receive said unthreaded portion of the second end of the threaded vertical screw gear.

3. The stand as claimed in claim 2 wherein said moving assembly control means comprises a DC power source for energizing the control means, said DC power source connected to a circuit breaker for circuit protection, said circuit breaker connected to a reversing polarity contactor for reversing the polarity of said electric motor thereby permitting forward and backwards rotation thereof; and, the electric motor for raising and lower the moving assembly.

4. The stand as claimed in claim 3 wherein the control means further comprises an up/down switch connected to relay switch means, said relay switch means in turn connected to said reversing polarity contactor for engaging the electric motor in a desired direction thereby lowering or raising the stand; first limit switch means adapted to permit only upward motion of the stand when the stand is in ground contact; and, second limit switch means adapted to permit only downward motion of the stand when the stand is in its retracted position.

5. The stand as claimed in claim 4 wherein the control means further comprises safety switch means comprising a motorcycle engine stop switch having an off position and an on position and connected to safety relay means which is in turn connected to said up/down switch so that said motorcycle engine will run only when the stand is in its retracted position or when the motorcycle is in neutral gear.

6. The stand as claimed in claim 5 wherein the up/down switch further includes an indicator light indicating that the stand is not retracted.

7. The stand as claimed in claim 6 wherein said anti-theft means comprises relay means adapted to isolate the electric motor from the battery when the stand is extended and the key has been removed from the starter relay so that the stand cannot be retracted when the key has been removed.

* * * * *